(12) United States Patent
Eronen et al.

(10) Patent No.: US 12,126,987 B2
(45) Date of Patent: Oct. 22, 2024

(54) VIRTUAL SCENE

(71) Applicant: Nokia Technologies Oy, Espoo (FI)

(72) Inventors: Antti Johannes Eronen, Tampere (FI); Sujeet Shyamsundar Mate, Tampere (FI); Arto Juhani Lehtiniemi, Lempaala (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 17/796,326

(22) PCT Filed: Jan. 27, 2021

(86) PCT No.: PCT/EP2021/051790
§ 371 (c)(1),
(2) Date: Jul. 29, 2022

(87) PCT Pub. No.: WO2021/156112
PCT Pub. Date: Aug. 12, 2021

(65) Prior Publication Data
US 2023/0077102 A1    Mar. 9, 2023

(30) Foreign Application Priority Data

Feb. 3, 2020    (EP) .................................... 20155087

(51) Int. Cl.
*H04S 7/00*    (2006.01)
*G06T 19/00*   (2011.01)

(52) U.S. Cl.
CPC .............. *H04S 7/304* (2013.01); *G06T 19/00* (2013.01); *H04S 2400/11* (2013.01)

(58) Field of Classification Search
CPC ....... H04S 7/304; H04S 2400/11; G06T 19/00
See application file for complete search history.

(56) References Cited

U.S. PATENT DOCUMENTS

| 4,457,019 A * | 6/1984 | Szabo, Jr. .............. H04B 5/266 455/501 |
| 2004/0030494 A1* | 2/2004 | Hull ........................ H04L 67/12 701/441 |

(Continued)

FOREIGN PATENT DOCUMENTS

| CN | 109791436 A | 5/2019 |
| CN | 110121695 A | 8/2019 |

(Continued)

OTHER PUBLICATIONS

Feb. 17, 2023 Communication from European Patent Office for EP Application No. 20155087.8-1224 including Letter of Reply from the Applicant accompanying an amended set of claims, received electronically on Jan. 25, 2022, 16 pages.

*Primary Examiner* — Daniel R Sellers
(74) *Attorney, Agent, or Firm* — Harrington & Smith

(57) ABSTRACT

An apparatus, method and computer program is described including: determining one of a plurality of audio modes for presentation of first audio to a user based on a location and/or movement of the user within a virtual scene, wherein the first audio includes a plurality of audio tracks located at different locations within the virtual scene; and rendering the first audio to the user in the determined audio mode, wherein: in a first audio mode of the plurality of audio modes, the locations of the audio tracks within the virtual scene are fixed and in a second audio mode of the plurality of audio modes, the locations of the audio tracks within the virtual scene move with the user.

20 Claims, 9 Drawing Sheets

(56) References Cited

U.S. PATENT DOCUMENTS

| | | | | |
|---|---|---|---|---|
| 2016/0124707 A1* | 5/2016 | Ermilov | ............... | G08G 1/0962 |
| | | | | 345/156 |
| 2018/0020312 A1* | 1/2018 | Visser | ..................... | H04S 7/306 |
| 2018/0048976 A1* | 2/2018 | Kimura | ................... | H04S 7/303 |
| 2018/0247646 A1* | 8/2018 | Meacham | ............... | G10L 25/30 |
| 2019/0394607 A1 | 12/2019 | Laaksonen et al. | ............. | 7/304 |
| 2020/0142667 A1* | 5/2020 | Querze | ................... | G06F 3/165 |
| 2020/0314592 A1* | 10/2020 | Dunn, Jr. | ............. | H04W 4/026 |
| 2020/0348135 A1* | 11/2020 | Eitel | ................... | H04W 64/006 |
| 2021/0168552 A1* | 6/2021 | Walther | .................. | H04S 7/303 |

FOREIGN PATENT DOCUMENTS

| | | | | | |
|---|---|---|---|---|---|
| EP | 3422743 A1 * | 1/2019 | | ............. | G06F 3/165 |
| EP | 3503592 A1 | 6/2019 | | | |
| EP | 3591503 A1 | 1/2020 | | | |
| WO | WO-2018220278 A1 * | 12/2018 | | ............. | H04R 5/033 |
| WO | WO-2019068959 A1 * | 4/2019 | | ............. | G06F 3/012 |

* cited by examiner

VIRTUAL SCENE

CROSS REFERENCE TO RELATED APPLICATION

This patent application is a U.S. National Stage application of International Patent Application Number PCT/EP2021/051790 filed Jan. 27, 2021, which is hereby incorporated by reference in its entirety, and claims priority to EP 20155087.8 filed Feb. 3, 2020, which is hereby incorporated by reference in its entirety.

FIELD

This specification relates to virtual scenes, for example to the presentation of audio to a user dependent on a virtual position of a user within the virtual scene.

BACKGROUND

A virtual scene enables a user to move around the virtual scene and to experience content in different ways depending on a virtual location of the user within the scene. There remains a need for alternative arrangements for providing and controlling audio content in virtual scenes.

SUMMARY

In a first aspect, this specification describes an apparatus comprising means for performing: determining one of a plurality of audio modes for presentation of first audio (e.g. volumetric audio) to a user based on a location and/or movement of the user within a virtual scene (e.g. a virtual reality, mixed reality or augmented reality scene, the said virtual scene may, for example, be a three-dimensional virtual scene), wherein the first audio comprises a plurality of audio tracks located at different locations within the virtual scene; and rendering the first audio to the user in the determined audio mode, wherein: in a first audio mode of the plurality of audio modes, the locations of the audio tracks within the virtual scene are fixed (e.g. such that the user can move relative to the audio tracks) and in a second audio mode (e.g. a so-called "user-centric" mode) of the plurality of audio modes, the locations of the audio tracks within the virtual scene move with the user. In the second audio mode, the locations of the audio tracks within the virtual scene may be fixed relative to the user. The first audio may be provided within a virtual scene about which the user can move (e.g. with 6-DoF movement, as discussed further below). The first audio mode may be a six degree-of-freedom audio mode and/or the second audio mode may be a three degrees-of-freedom audio mode.

In some example embodiments, the means for determining one of the plurality of audio modes may be further configured to determine the audio mode depending on the location of the user within the virtual scene relative to a first zone associated with the first audio. The means for determining one of the plurality of audio modes may be further configured to determine that the first audio mode be used for presentation of the first audio when the user enters the first zone or approaches the first zone from outside said first zone. Some example embodiments further comprise: positioning the first zone associated with the first audio within the virtual scene, on initiation of the first audio mode, such that the user is at a central point of said first zone.

The means for determining one of the plurality of audio modes may be further configured to determine that the second audio mode be used for presentation of the first audio when the user approaches an edge of the first zone from inside said zone. The means may be further configured to perform: moving (e.g. gradually moving, for example such that the movement of audio is smoothed), in the second audio mode, the first zone and the audio tracks of the first audio as the user moves.

The means may be further configured to enable the user to exit the first zone. Exiting the first zone may result in the first audio changing.

The means for determining one of the plurality of audio modes may be further configured to perform: determining that the first audio mode be used for presentation of the first audio to the user in the event that the user is determined to be stationary (e.g. if the user does not move for more than a threshold period of which—the threshold period could be variable, such as context specific). Thus, a transition from the second audio mode to the first audio mode may be implemented.

The means may be further configured to select the first audio from a plurality of candidate first audios based on determining that the user is located, in the virtual scene, within a constellation of audio tracks of the selected first audio.

The means may be further configured to perform: determining that the user has exited a/the constellation of audio tracks of the first audio; and ceasing to render said first audio to the user in response to the determination of said exit.

In some example embodiments, audio from different musical instruments may be assigned to different audio tracks of the first audio. For example, different musical instructions may be presented at different locations within the relevant virtual space (e.g. such that an "instrument constellation" is provided).

The said means may comprise: at least one processor; and at least one memory including computer program code, the at least one memory and the computer program configured, with the at least one processor, to cause the performance of the apparatus.

In a second aspect, this specification describes a method comprising: determining one of a plurality of audio modes for presentation of first audio to a user based on a location and/or movement of the user within a virtual scene, wherein the first audio comprises a plurality of audio tracks located at different locations within the virtual scene; and rendering the first audio to the user in the determined audio mode, wherein: in a first audio mode of the plurality of audio modes, the locations of the audio tracks within the virtual scene are fixed and in a second audio mode of the plurality of audio modes, the locations of the audio tracks within the virtual scene move with the user. In the second audio mode, the locations of the audio tracks within the virtual scene may be fixed relative to the user.

Some example embodiments further comprise: determining the audio mode depending on the location of the user within the virtual scene relative to a first zone associated with the first audio. Determining one of the plurality of audio modes may comprising determining that the first audio mode be used for presentation of the first audio when the user enters the first zone or approaches the first zone from outside said first zone.

Some example embodiments further comprise: positioning the first zone associated with the first audio within the virtual scene, on initiation of the first audio mode, such that the user is at a central point of said first zone.

In some example embodiments, determining one of the plurality of audio modes further comprises determining that the second audio mode be used for presentation of the first audio when the user approaches an edge of the first zone from inside said zone. Some example embodiments further comprise: moving (e.g. gradually moving), in the second audio mode, the first zone and the audio tracks of the first audio as the user moves.

Some example embodiments further comprise enabling the user to exit the first zone.

Some example embodiments further comprise: determining that the first audio mode be used for presentation of the first audio to the user in the event that the user is determined to be stationary.

Some example embodiments further comprise: selecting the first audio from a plurality of candidate first audios based on determining that the user is located, in the virtual scene, within a constellation of audio tracks of the selected first audio.

Some example embodiments further comprise: determining that the user has exited a/the constellation of audio tracks of the first audio; and ceasing to render said first audio to the user in response to the determination of said exit.

In some example embodiments, audio from different musical instruments may be assigned to different audio tracks of the first audio.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: determining one of a plurality of audio modes for presentation of first audio to a user based on a location and/or movement of the user within a virtual scene, wherein the first audio comprises a plurality of audio tracks located at different locations within the virtual scene; and rendering the first audio to the user in the determined audio mode, wherein: in a first audio mode of the plurality of audio modes, the locations of the audio tracks within the virtual scene are fixed and in a second audio mode of the plurality of audio modes, the locations of the audio tracks within the virtual scene move with the user.

In a sixth aspect, this specification describes a computer-readable medium (such as a non-transitory computer-readable medium) comprising program instructions stored thereon for performing at least the following: determining one of a plurality of audio modes for presentation of first audio to a user based on a location and/or movement of the user within a virtual scene, wherein the first audio comprises a plurality of audio tracks located at different locations within the virtual scene; and rendering the first audio to the user in the determined audio mode, wherein: in a first audio mode of the plurality of audio modes, the locations of the audio tracks within the virtual scene are fixed and in a second audio mode of the plurality of audio modes, the locations of the audio tracks within the virtual scene move with the user.

In a seventh aspect, this specification describes an apparatus comprising: at least one processor; and at least one memory including computer program code which, when executed by the at least one processor, causes the apparatus to: determine one of a plurality of audio modes for presentation of first audio to a user based on a location and/or movement of the user within a virtual scene, wherein the first audio comprises a plurality of audio tracks located at different locations within the virtual scene; and render the first audio to the user in the determined audio mode, wherein: in a first audio mode of the plurality of audio modes, the locations of the audio tracks within the virtual scene are fixed and in a second audio mode of the plurality of audio modes, the locations of the audio tracks within the virtual scene move with the user.

In an eighth aspect, this specification describes an apparatus comprising: means (such as a first processor, which may, for example, form part of a control system) for determining one of a plurality of audio modes for presentation of first audio to a user based on a location and/or movement of the user within a virtual scene, wherein the first audio comprises a plurality of audio tracks located at different locations within the virtual scene; and means (such as a rendering means, e.g. a media player) for rendering the first audio to the user in the determined audio mode, wherein: in a first audio mode of the plurality of audio modes, the locations of the audio tracks within the virtual scene are fixed and in a second audio mode of the plurality of audio modes, the locations of the audio tracks within the virtual scene move with the user.

BRIEF DESCRIPTION OF THE DRAWINGS

Example embodiments will now be described, by way of example only, with reference to the following schematic drawings, in which.

DETAILED DESCRIPTION

Figure 1:
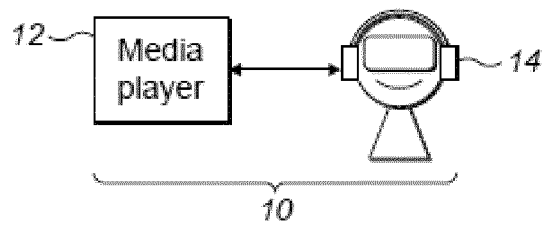
FIG. 1 is a block diagram of a virtual reality display system in which example embodiments may be implemented.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Virtual reality (VR) can generally be understood as a rendered version of visual and/or audio scenes. The rendering may be designed to mimic visual and audio sensory stimuli of the real world in order to provide a natural experience to a user that is at least significantly consistent with their movement within a virtual scene according to the limits defined by the content and/or application.

VR in many cases, but not necessarily all cases, requires a user to wear a head mounted display (HMD), to completely replace the user's field of view with a simulated visual presentation, and to wear headphones, to provide the user the simulated audio content similarly completely replacing the sound scene of the physical space. Some form of head tracking and general motion tracking of the user consuming VR content may also be necessary. This allows the simulated visual and audio presentation to be updated in order to ensure that, from the user's perspective, various scene components such as items and sound sources remain consistent with the user's movements. Additional means to interact with the virtual reality simulation, such as controls or other user interfaces (UI) may be provided but are not strictly necessary for providing the experience.

VR can in some use cases be visual-only or audio-only virtual reality. For example, an audio-only VR experience may relate to a new type of music listening or any other audio experience.

Augmented reality (AR) generally refers to providing user with additional information or artificially generated items or content that is at least significantly overlaid upon the user's current real-world environment stimuli. In some such cases, the augmented content may at least partly replace a real-world content for the user. Additional information or content may be visual and/or audible. AR may have visual-only or audio-only presentation. For example, a user may move about a city and receive audio guidance relating to, e.g., navigation, location-based advertisements, and any other location-based information.

Mixed reality (MR) is sometimes considered as a more advanced form of AR where at least some virtual elements are inserted into the physical scene such that they provide the illusion that these elements are part of the real scene and behave accordingly. For audio content, or indeed audio-only use cases, many applications of AR and MR may appear difficult for the user to tell from one another. However, the difference is not only for visual content but it may be relevant also for audio. For example, MR audio rendering may take into account a local room reverberation, e.g., while AR audio rendering may not.

In a 3D space, there are in total six degrees of freedom (DoF) defining the way the user may move within the space. This movement is divided into two categories: rotational movement and translational movement (with three degrees of freedom each). Rotational movement is sufficient for a simple VR experience where the user may turn his/her head (pitch, yaw, and roll) to experience the space from a static point or along an automatically moving trajectory. Translational movement means that the user may also change the position of the rendering, i.e., move along the x, y, and z axes in Euclidean space according to their wishes. Free-viewpoint AR/VR experiences allow for both rotational and translational movements. It is common to talk about the various degrees of freedom and the related experiences using the terms 3DoF, 3DoF+ and 6DoF. 3DoF+ falls somewhat between 3DoF and 6DoF and typically allows for some limited user movement, e.g., it can be considered to implement a restricted 6DoF where the user is sitting down but can lean their head in various directions.

FIG. 1 is a block diagram of a virtual reality display system, indicated generally by the reference numeral 10, in which example embodiments may be implemented. The virtual reality display system 10 includes a user device in the form of a virtual reality headset 14, for displaying visual data and/or presenting audio data for a virtual reality space, and a virtual reality media player 12 for rendering visual and/or audio data on the virtual reality headset 14. In some example embodiments, a separate user control (not shown) may be associated with the virtual reality display system, e.g. a hand-held controller.

A virtual space, world or environment may be a computer-generated version of a space, for example a captured real world space, in which a user can be immersed. In some example embodiments, the virtual space or scene may be entirely computer-generated. The virtual reality headset 14 may be of any suitable type. The virtual reality headset 14 may be configured to provide virtual reality video and/or audio content data to a user. As such, the user may be immersed in virtual space.

In the example virtual reality display system 10, the virtual reality headset 14 receives the virtual reality content data from a virtual reality media player 12. The virtual reality media player 12 may be part of a separate device that is connected to the virtual reality headset 14 by a wired or wireless connection. For example, the virtual reality media player 12 may include a games console, or a PC (Personal Computer) configured to communicate visual data to the virtual reality headset 14.

Alternatively, the virtual reality media player 12 may form part of the virtual reality headset 14.

The virtual reality media player 12 may comprise a mobile phone, smartphone or tablet computer configured to provide content through its display. For example, the virtual reality media player 12 may be a touchscreen device having a large display over a major surface of the device, through which video content can be displayed. The virtual reality media player 12 may be inserted into a holder of a virtual reality headset 14. With such virtual reality headsets 14, a smart phone or tablet computer may display visual data which is provided to a user's eyes via respective lenses in the virtual reality headset 14. The virtual reality audio may be presented, e.g., by loudspeakers that are integrated into the virtual reality headset 14 or headphones that are connected to it. The virtual reality display system 10 may also include hardware configured to convert the device to operate as part of virtual reality display system 10. Alternatively, the virtual reality media player 12 may be integrated into the virtual reality headset 14. The virtual reality media player 12 may be implemented in software. In some example embodiments, a device comprising virtual reality media player software is referred to as the virtual reality media player 12.

The virtual reality display system 10 may include means for determining the spatial position of the user and/or orientation of the user's head. This may be by means of determining the spatial position and/or orientation of the virtual reality headset 14. Over successive time frames, a measure of movement may therefore be calculated and stored. Such means may comprise part of the virtual reality media player 12. Alternatively, the means may comprise part of the virtual reality headset 14. For example, the virtual reality headset 14 may incorporate motion tracking sensors which may include one or more of gyroscopes, accelerometers and structured light systems. These sensors generate position data from which a current visual field-of-view (FOV) is determined and updated as the user, and so the virtual reality headset 14, changes position and/or orientation. The virtual reality headset 14 may comprise two digital screens for displaying stereoscopic video images of the virtual world in front of respective eyes of the user, and also two headphones, earphone or speakers for delivering audio. The example embodiments herein are not limited to a particular type of virtual reality headset 14.

In some example embodiments, the virtual reality display system 10 may determine the spatial position and/or orientation of the user's head using the above-mentioned six degrees-of-freedom method. These may include measurements of pitch, roll and yaw and also translational movement in Euclidean space along side-to-side, front-to-back and up-and-down axes.

The virtual reality display system 10 may be configured to display virtual reality content data to the virtual reality headset 14 based on spatial position and/or the orientation of the virtual reality headset. A detected change in spatial position and/or orientation, i.e. a form of movement, may result in a corresponding change in the visual and/or audio data to reflect a position or orientation transformation of the user with reference to the space into which the visual data is projected. This allows virtual reality content data to be consumed with the user experiencing a 3D virtual reality environment.

In the context of volumetric virtual reality spaces or worlds, a user's position may be detected relative to content provided within the volumetric virtual reality content, e.g. so that the user can move freely within a given virtual reality space or world, around individual objects or groups of objects, and can view and/or listen to the objects from different angles depending on the rotation of their head.

Audio data may be provided to headphones provided as part of the virtual reality headset 14. The audio data may represent spatial audio source content. Spatial audio may refer to directional rendering of audio in the virtual reality space or world such that a detected change in the user's spatial position or in the orientation of their head may result in a corresponding change in the spatial audio rendering to reflect a transformation with reference to the space in which the spatial audio data is rendered.

Figure 2:
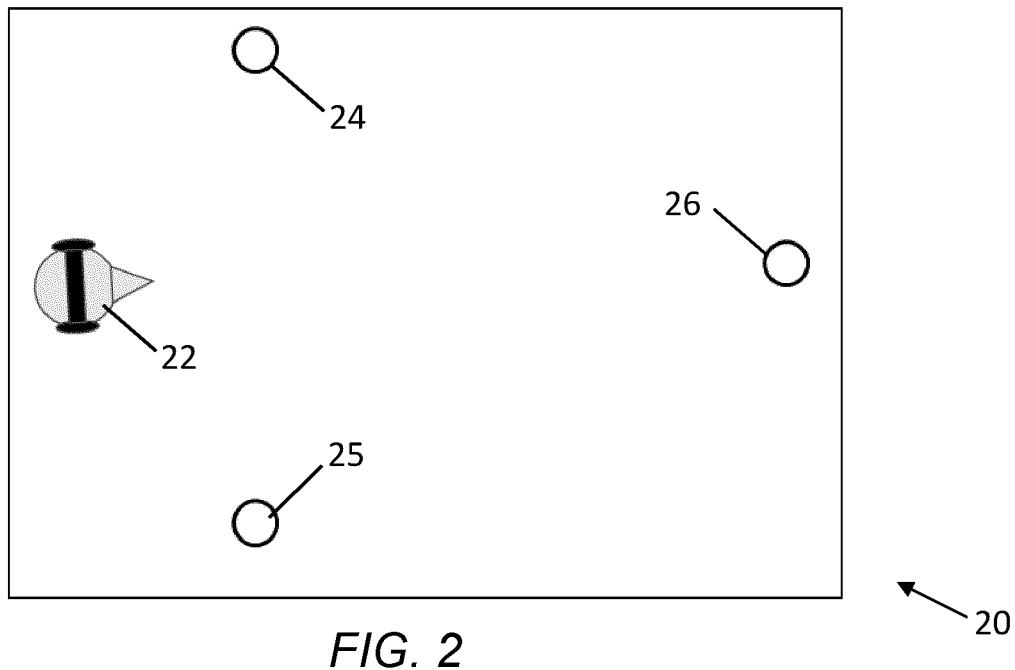
FIG. 2 is a virtual environment in accordance with an example embodiment.

FIG. 2 is a virtual environment, indicated generally by the reference numeral 20, in accordance with an example embodiment. The virtual environment 20 may be implemented using the virtual reality display system 10 described above. The virtual environment 20 shows a user 22 and first to third audio sources 24 to 26. The user 22 may be wearing the virtual reality headset 14 described above in order to experience the virtual environment 20.

The virtual environment 20 may therefore present a virtual scene (e.g. a virtual reality, mixed reality or augmented reality scene) to the user 22. The scene may, for example, be a three-dimensional virtual reality scene.

The virtual environment 20 is a virtual audio scene and the user 22 has a position and an orientation within the scene. The audio presented to the user 22 (e.g. using the virtual reality headset 14) is dependent on the position and orientation of the user 22, such that a 6DoF scene may be provided.

The first to third audio sources 24 to 26 may, for example, be used to output a song to the user 22. In one example embodiment, different musical instruments (or audio from different musical instruments) are assigned to different the different audio sources (or tracks) 24 to 26 of the first audio. Thus, different instruments may be presented at different locations within the virtual environment 20 (e.g. such that an "instrument constellation" is provided). Such constellations are particularly suitable for presenting legacy content such as music tracks which are available as multitrack recordings.

6DoF audio provides an audio experience in which the user 22 can move within the audio scene. However, providing a full 6DoF content experience may require that the content be specifically spatially arranged and created for 6DoF consumption. Such systems may not be compatible with legacy audio content.

Figure 3:
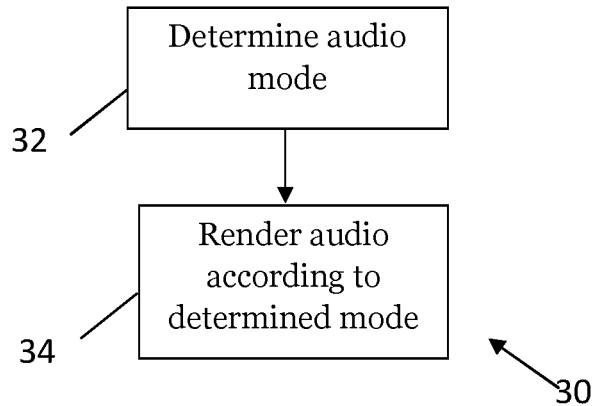
FIGS. 3 and 4 are flow charts showing algorithms in accordance with an example embodiment.

FIG. 3 is a flow chart showing an algorithm, indicated generally by the reference numeral 30, in accordance with an example embodiment.

The algorithm 30 starts at operation 32, where one of a plurality of audio modes for presentation of first audio (e.g. volumetric audio) to a user (e.g. the user 22) is determined. The determination of the audio mode may be based on a location and/or movement of the user within a virtual scene, such as the virtual environment 20. Thus, the first audio is provided within the virtual scene about which the user can move (e.g. with 6-DoF movement). The first audio may include a plurality of audio tracks located at different locations within the virtual scene. The audio sources 24 to 26 are examples of such audio tracks.

At operation 34, audio is rendered (e.g. to the user 22) in the determined audio mode, i.e. the mode determined in operation 32.

As described in detail below, the audio modes may include a first audio mode in which the locations of the audio tracks within the virtual scene are fixed (such that the user can move relative to the audio tracks) and a second audio mode in which the locations of the audio tracks within the virtual scene move with the user. The first audio mode may be a 6-DoF audio mode. The second audio mode may be a 3-DoF audio mode.

Figure 4:
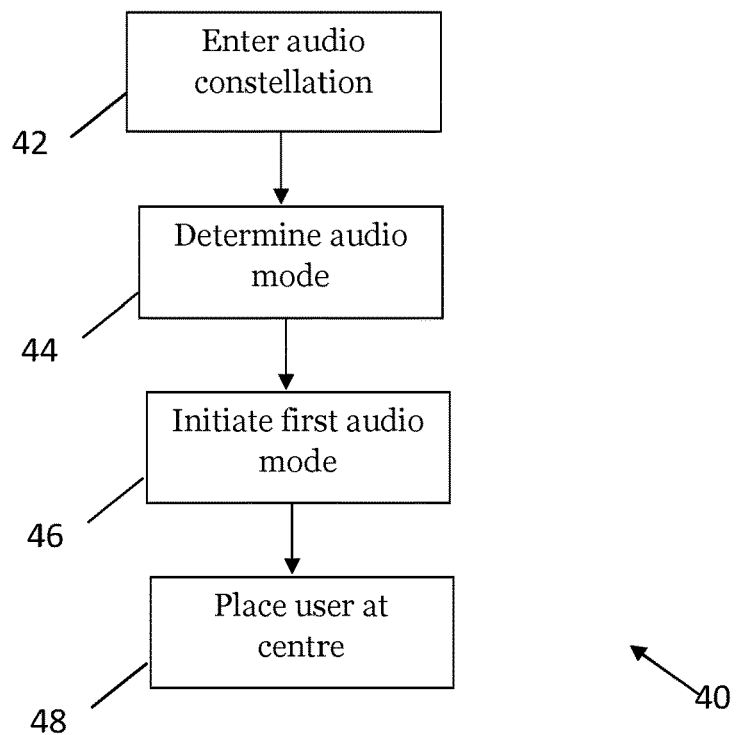

FIG. 4 is a flow chart showing an algorithm, indicated generally by the reference numeral 40, in accordance with an example embodiment. The algorithm 40 is described further below with reference to FIGS. 5 to 7.

The algorithm 40 starts with an optional operation 42 in which a user (such as the user 22) enters an audio constellation, such as a constellation of audio sources or audio tracks. For example, the first to third audio sources 24 to 26 may constitute an audio constellation. The operation 42 may, for example, involve the selection of a first audio from a plurality of candidate first audios by determining that the user is located, in the virtual scene, within, or within the vicinity of, a constellation of audio tracks of the selected first audio of the plurality of candidate first audios.

In operation 44 of the algorithm 40, an audio mode is determined.

Figure 5:
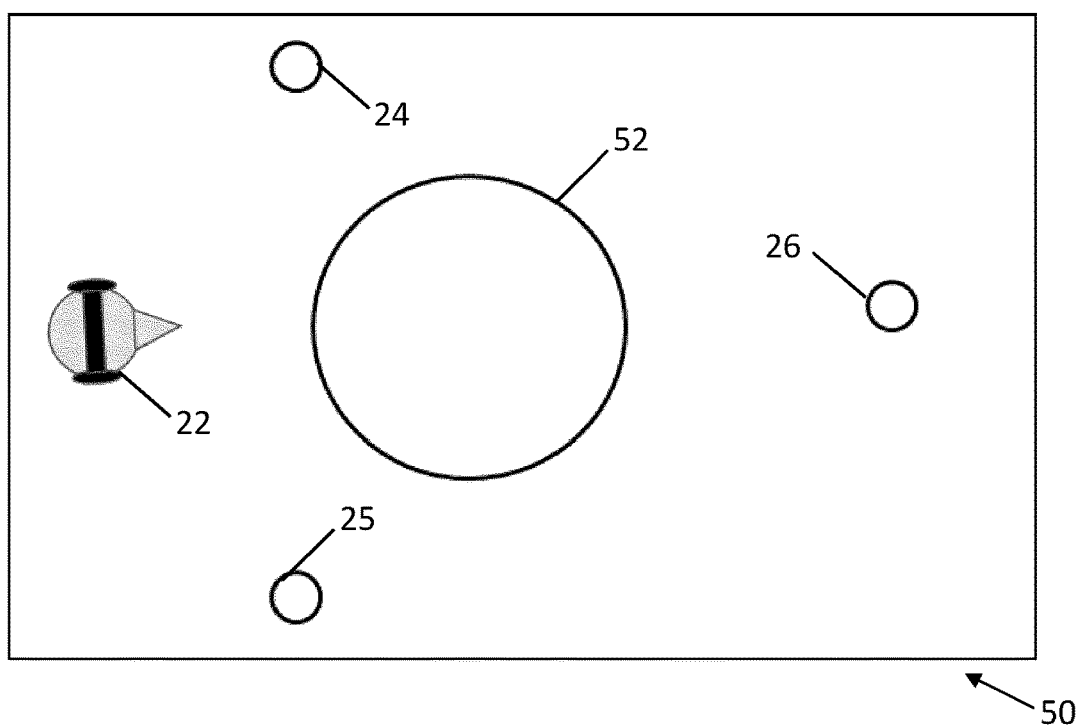
FIGS. 5 to 7 are virtual environments in accordance with example embodiments.

FIG. 5 is a virtual environment, indicated generally by the reference numeral 50, in accordance with an example embodiment. The virtual environment 50 includes the user 22 and the first to third audio sources 24 to 26 described above. The virtual environment 50 further comprises a first zone 52. As shown in FIG. 5, the user 22 is outside the first zone 52. That zone may be visible to the user in some way within the virtual environment, for example with different colouring of objects depending on whether the user 22 is inside or outside the first zone 52 (although this is not essential to all example embodiments).

In the operation 44 of the algorithm 40, the determination of the audio mode may be dependent on the location of the user 22 relative to the first zone 52. For example, the audio mode selection may be dependent on whether the user 22 is outside the first zone 52 (as shown in the virtual environment 50) or inside the first zone (as discussed below).

Figure 6:
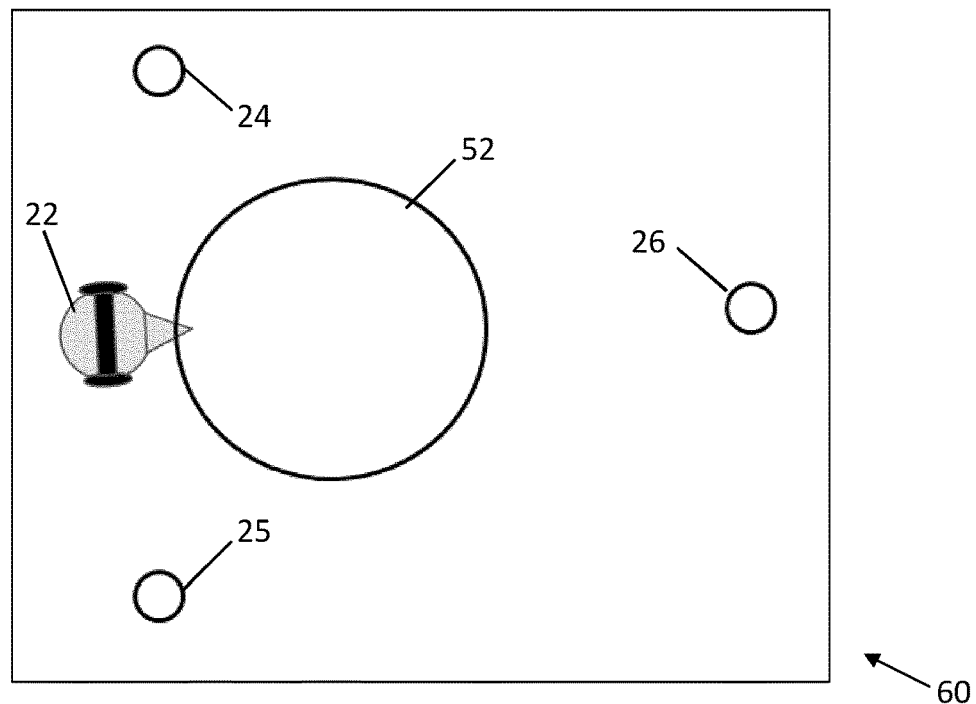

FIG. 6 is a virtual environment, indicated generally by the reference numeral 60, in accordance with an example embodiment. The virtual environment 60 includes the user 22, the first to third audio sources 24 to 26 and the first zone 52 described above. In the virtual environment 60, the user 22 is approaching the first zone from outside said zone.

In operation 46 of the algorithm 40, the first audio mode is initiated. The operation 46 may initiate the first audio mode when the user approaches (e.g. makes contact with) the first zone 52, as shown in the virtual environment 60.

In operation 48 of the algorithm 40, the first zone 52 is positioned within the virtual space, on initiation of the first audio mode, such that the user 22 is at a central point of said first zone.

Figure 7:
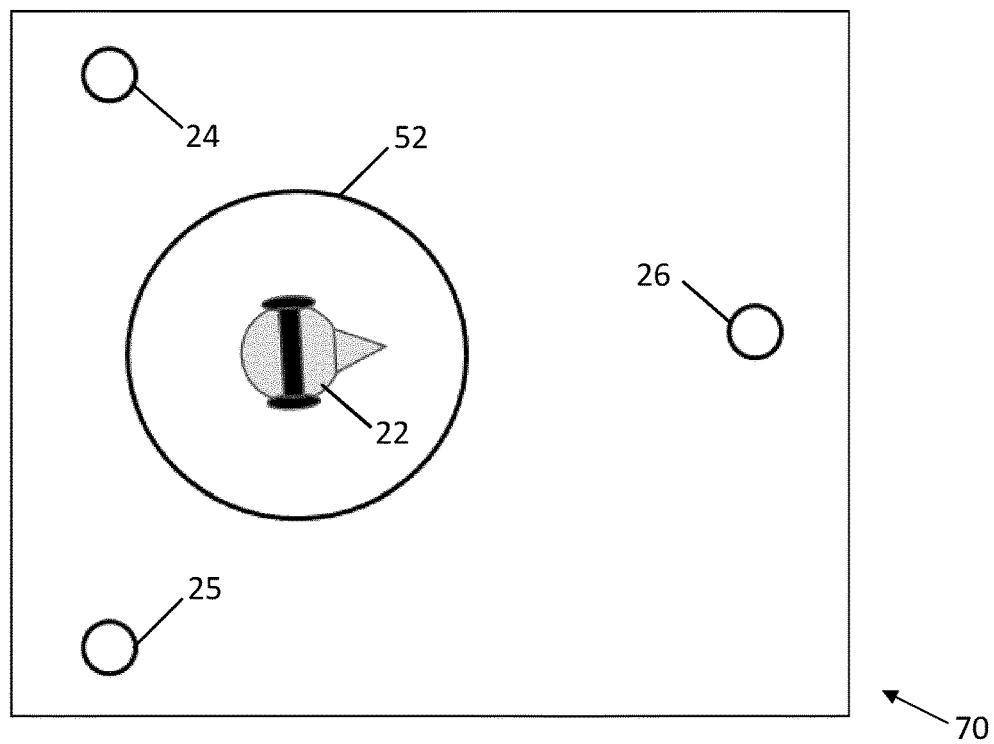

FIG. 7 is a virtual environment, indicated generally by the reference numeral 70, in accordance with an example embodiment. The virtual environment 70 includes the user 22, the first to third audio sources 24 to 26 and the first zone 52 described above. In the virtual environment 70, the first zone 52 is positioned such that the user is at a central point of that zone. Thus, the virtual environment 70 shows the situation following the actuation of the operation 48 of the algorithm 40.

In the virtual environment 70 in which the user experiences the constellation comprising the first to third audio sources 24 to 26 in the first audio mode, the audio sources are presented to the user 22 with six degrees-of-freedom. Thus, the user is able to move, whilst the positions of the audio sources remain fixed (so called "world locked"). The user can therefore experience the sound scene differently by moving relative to the audio sources 24 to 26 (and any other audio source, not shown, that might form a part of the audio constellation).

Figure 8:
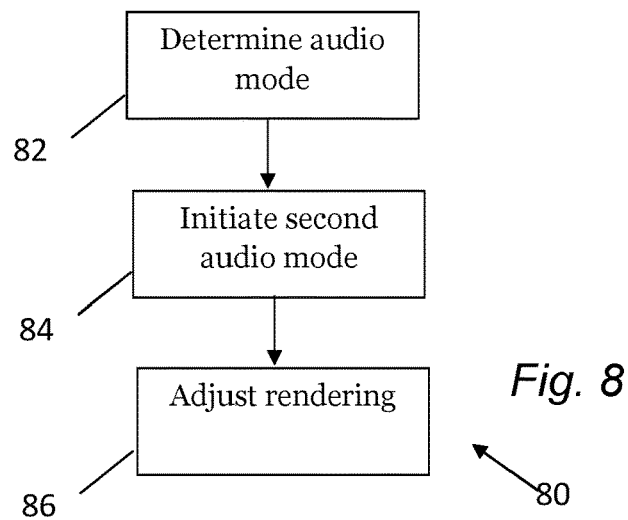
FIG. 8 is a flow chart showing an algorithm in accordance with an example embodiment.

FIG. 8 is a flow chart showing an algorithm, indicated generally by the reference numeral 80, in accordance with an example embodiment. The algorithm 80 is described further below with reference to FIGS. 9 and 10.

The algorithm 80 starts at operation 82, where an audio mode is determined.

Figure 9:
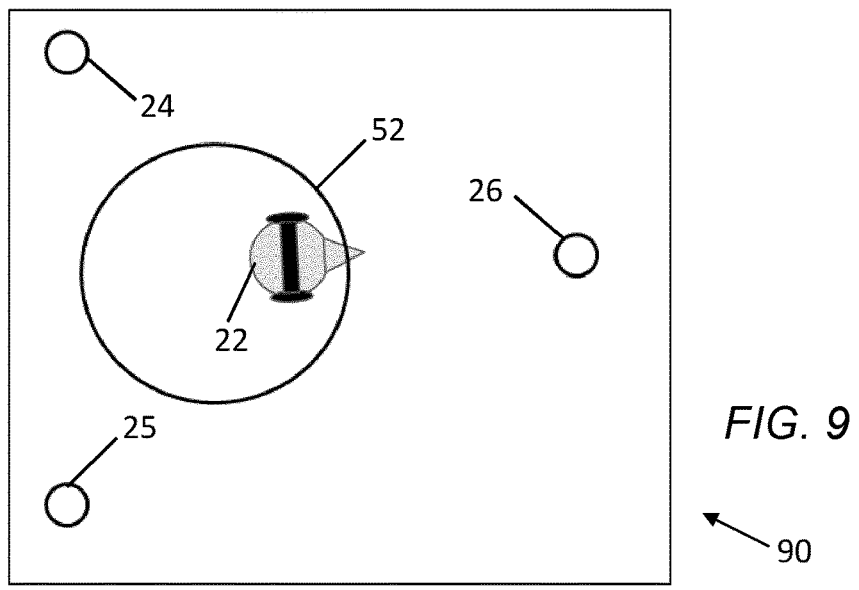
FIGS. 9 and 10 are virtual environments in accordance with example embodiments.

FIG. 9 is a virtual environment, indicated generally by the reference numeral 90, in accordance with an example embodiment. The virtual environment 90 includes the user 22, the first to third audio sources 24 to 26 and the first zone 52 described above. In the virtual environment 90, the user 22 approaches or touches an edge or a boundary of the first zone 52 of the constellation. In response, it is determined in the operation 82 of the algorithm 80 that a second audio mode should be entered.

At operation 84 of the algorithm 80, the second audio mode is initiated. In the second audio mode, the location of the audio sources 24 to 26 of the first audio and the first zone 52 move as the user moves. Thus, rather than moving outside the first zone 52, the first audio constellation moves such that the user stays within the first zone. Thus, in contrast with the 6DoF audio presentation of the first audio mode, the second audio mode presents the audio constellation to the user 22 as 3DoF audio.

At operation 86 of the algorithm 80, the rendering of audio to the user 22 is adjusted as the user moves.

Figure 10:
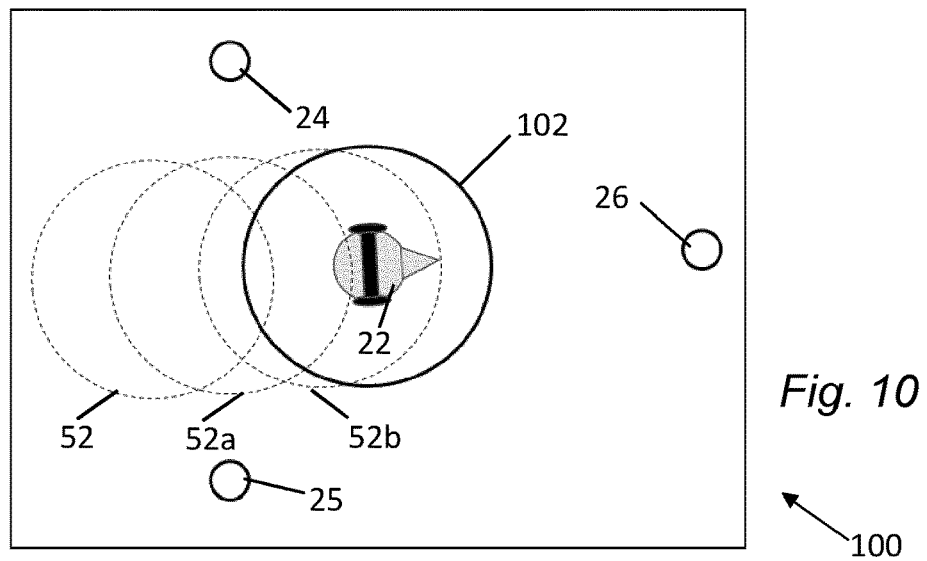

FIG. 10 is a virtual environment, indicated generally by the reference numeral 100, in accordance with an example embodiment. The virtual environment 100 includes the user 22, the first to third audio sources 24 to 26 and the first zone 52.

As shown in FIG. 10, the first zone 52 moves from an initial position to a position 102 as the user 22 moves, such that the user remains in the centre of the first zone. The position of the audio constellation (comprising the first to the third audio sources 24 to 26) and the first zone move gradually such that the user is eventually in the centre of the constellation and/or optimal listening position. The change may gradual such that the objects slowly slide towards the new locations, thereby smoothing the movement of the audio. A third party application, such as an immersive phone call may trigger this functionality to better allow user movement. In an immersive call scenario, it may be beneficial if the call audio scene will follow the user. As another example, starting an application such as sports tracker can trigger the functionality.

Figure 11:
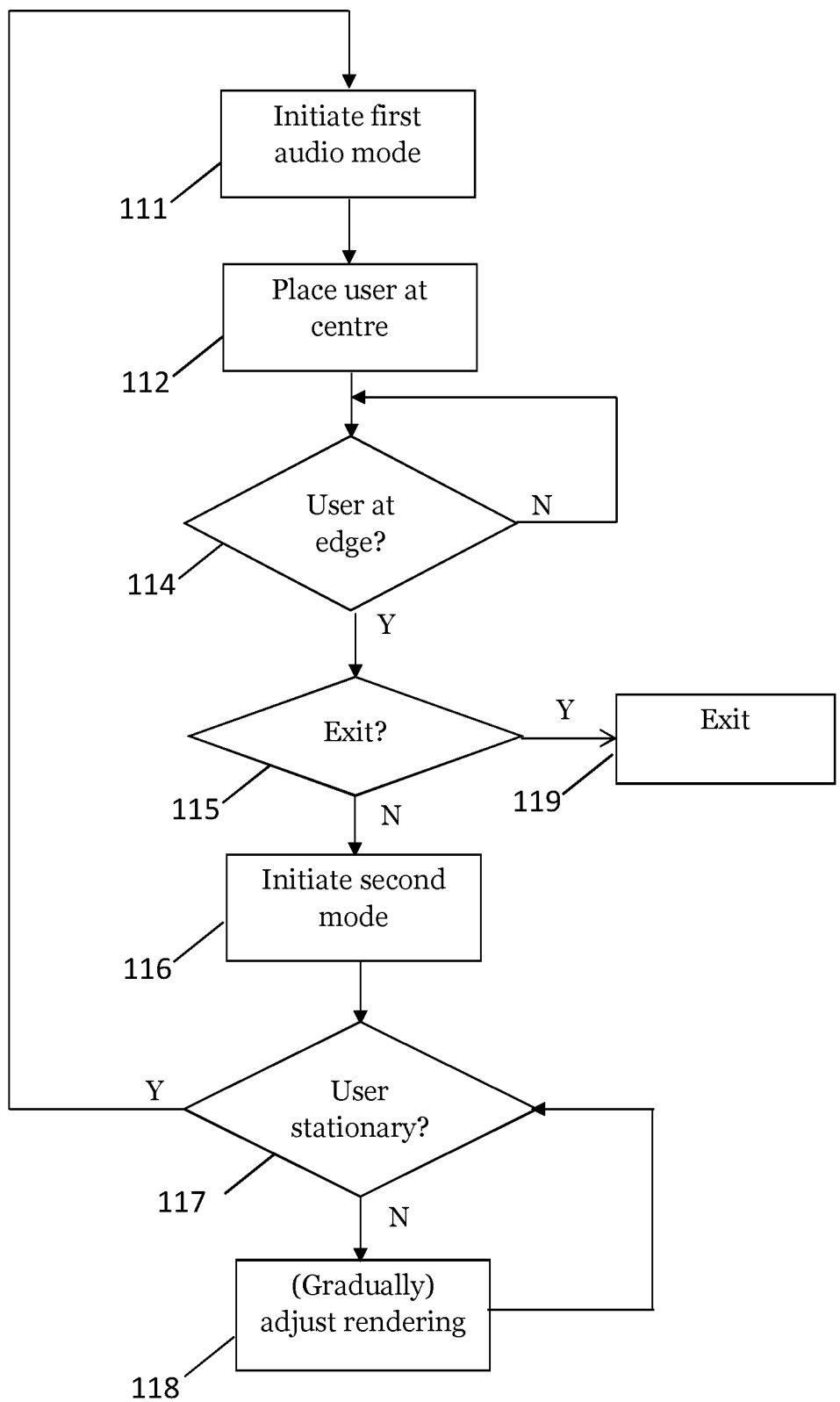
FIG. 11 is a flow chart showing an algorithm in accordance with an example embodiment.

FIG. 11 is a flow chart showing an example algorithm, indicated generally by the reference numeral 110, in accordance with an example embodiment. The algorithm 110 includes many of the features of the algorithms 40 and 80 described above.

The algorithm 110 starts at operation 111, where the first audio mode is initiated (as in the operation 46 described above). As discussed above, in the first audio mode, first audio comprising a plurality of audio tracks located at different locations within a virtual scene is rendered to the user. The locations of the audio tracks within the virtual scene are fixed. Thus, the first audio is provided within a VR world about which the user can move (with 6-DoF movement).

At operation 112 of the algorithm 110, the user is placed at the centre of the first zone (and the relevant audio constellation), as in the operation 48 described above.

At operation 114, a determination is made regarding whether the user is at (or approaching) the edge of the first zone 52, as shown, for example, in FIG. 9 described above. If not, the algorithm remains in the first audio mode (and the user 22 is able to move relative to the audio tracks of the relevant audio constellation. If the user is at (or approaching) the edge of the first zone 52, then the algorithm 110 moves to operation 115.

At operation 115, it is determined whether the user is exiting the constellation of audio tracks of the first audio (as discussed further below). If so, the algorithm 110 moves to operation 119, where the algorithm is exited, resulting in ceasing to render the first audio to the user. If not, the algorithm 110 moves to operation 116 (discussed below). In one example embodiment, when an audio output (such as a song) being presented to the user ends, then the user automatically exits the constellation. The user can then enter another constellation and start consuming the audio within that constellation.

At operation 116, it has already been determined that the user is at or approaching the boundary of the first zone 52 and that the user is not exiting that zone. In response, the second audio mode is initiated. This behaviour may be triggered, for example, by an external application, such as an immersive call. The user 22 may be able to avoid this behaviour by an interaction, such as dodging around objects while exiting the first zone. (This is one mechanism by which the user may be able to exit the first zone in the operation 115 referred to above.)

At operation 117 of the algorithm 110, a determination is made regarding whether the user 22 is stationary or moving. For example, a determination may be made regarding whether the user has been stationary for more than a threshold period of time. If the user 22 is determined to be stationary, then the algorithm moves to operation 111 (where the first audio mode is re-entered). Otherwise, the algorithm 110 remains in the second audio mode. Note that the threshold period of time could be variable (e.g. context specific).

In operation 118 of the algorithm 110, the algorithm 110 is in the second mode of operation. In the second mode, the constellation of audio tracks 24 to 26 are user centric such that the user can drag the content in 3DoF. The rendering of the audio tracks is adjusted. For example, the rendering may be adjusted gradually such that movements are smoothed. In this way, the audio constellation can be gradually updated so that the user is finally in the centre of the constellation and/or optimal listening position. With the user in the middle of the relevant audio constellation, the constellation automatically moves together with the user (i.e. the audio is user-centric). As noted above, such constellations are particularly suitable for presenting legacy content such as music tracks which are available as multitrack recordings. The method conveniently enables user to listen to background music as the constellations of objects are automatically carried along with him, ensuring a nice listening experience even during movement.

The operation 118 of the algorithm 110 is repeated (and the algorithm remains in the second audio mode) until the user is deemed to be stationary in an instance of the operation 117.

Figure 12:
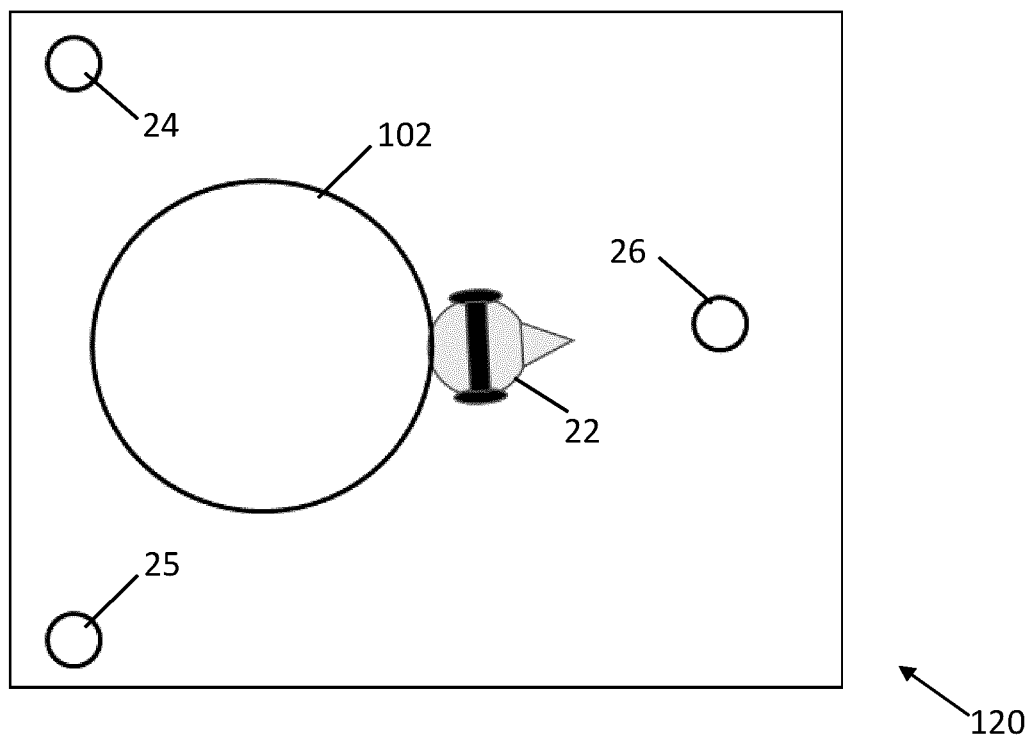
FIG. 12 is a virtual environment in accordance with an example embodiment.

FIG. 12 is a virtual environment, indicated generally by the reference numeral 120, in accordance with an example embodiment. The virtual environment 120 includes the user 22, the first to third audio sources 24 to 26 and the first zone 102 described above. In the virtual environment 120, the user 22 has exited the first zone 102 (thereby implementing the operation 119 of the algorithm 110).

The user 22 may exit the first zone 102 by means of a defined interaction, such as dodging around objects while exiting the first zone 102. The change of functionality can be visualized to the user, e.g., with different colouring of objects once the user 22 is outside the first zone 102. Alternatively, or in addition, the user may exit the first zone 102 as a result of external factors, such as the ending of a media item providing the relevant audio content.

Figure 13:
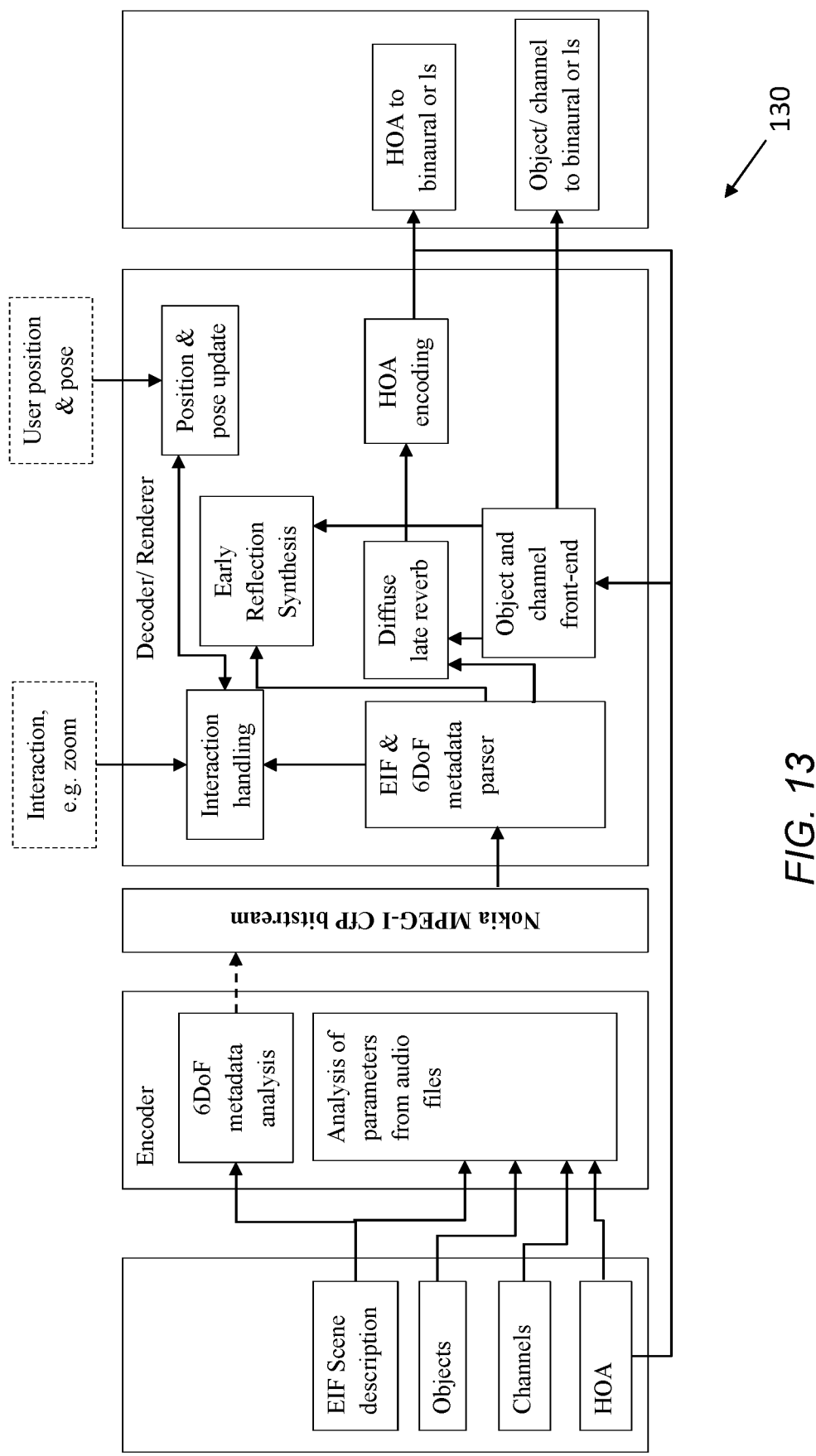
FIG. 13 is a block diagram of a system in accordance with an example embodiment.

FIG. 13 is a block diagram of a system, indicated generally by the reference numeral 130, in accordance with an example embodiment.

The system 130 is an example deployment of a 6DoF renderer for MPEG-I 6DoF audio. The skilled person will be aware of alternative possible implementations of the principles described herein.

The MPEG-I 6DoF audio renderer 130 receives an encoder input format specification or other specification, which describes the scene graph (e.g. scene geometry and object positions). Such input scene can also define the metadata for the content constellations.

Definitions used by the system 130 include at least some of:
Position(s) of audio objects (such as the audio sources 24 to 26);
Position of first zone 52 or 102;
A triggering condition for user locking (second audio mode) of the audio constellation when user position matches first zone 52 or 102 and user centering the constellation;
A triggering condition for world locking (first audio mode) the audio constellation when user position is within the first zone 52 or 102;
A triggering condition for world locking (first audio mode) the audio constellation when an audio output (e.g. a musical track) associated with the constellation objects ends.

The triggering may be handled in the render side (such as the blocks "Interaction handling" and "Position &pose update" in the system 130).

In world locked mode (first audio mode), the positions of audio objects with respect to the user are updated taking into account user translation in Euclidean coordinates x, y, z and rotation in yaw, pitch, roll. In user locked mode (second audio mode), the object positions with respect to the user are updated only considering the user head rotation in yaw, pitch and roll.

After object positions are updated, audio may rendered from the correct direction and distance using head-related-transfer-function (HRFT) filtering and distance/gain attenuation. Virtual acoustics such as reverberation adjusted to the characteristics of the virtual space can be used for enhancing the immersion. The skilled person will be aware of alternative implementation of such functions.

A number of extensions or modifications to the MPEG-I encoder input format (EIF) may be implemented in order to support aspects of example embodiments described herein. These may include:

Extension of the listener proximity condition from world locked position to audio elements and group of audio elements.

The channel source support in MPEG-I Audio EIF can be extended to support multiple object sources or HOA group.

The EIF can be extended to trigger an update which is also engagement duration. This may be required to attach a constellation to the user in the beginning or disengagement later.

The transition from one state to another (e.g. one audio mode to another) may be immediate or continuous. This can be extended to incorporate translation of the entire constellation when the user moves after reaching the edge of the inner circle.

The listener conditions are further extended from the earlier enable disabled to modifying the coordinate system from world locked to user relative.

Furthermore, the conditions utilize a mix of relative and world locked, for condition and action.

As example modification to the encoder input format (EIF), the following modifications can be done to implement the content zones functionality for MPEG-I 6DoF audio content.

Modifying the ObjectSource as Shown Below:

<ObjectSource>

Declares an Objectsource which emits sound into the virtual scene. The Objectsource has a position/orientation in space. The radiation pattern can be controlled by a directivity. If no directivity attribute is present, the source radiates omnidirectional. Optionally it can have a spatial extent, which is specified through a geometric object. If no extent is specified, the source is a point source. The signal component of the Objectsource must contain at least one waveform.

| Attribute | Type | Flags | Default | Description |
|---|---|---|---|---|
| id | ID | R | | Identifier |
| position | Position | R, M | | Position |

\<ObjectSource\>

Declares an Objectsource which emits sound into the virtual scene. The Objectsource has a position/orientation in space. The radiation pattern can be controlled by a directivity. If no directivity attribute is present, the source radiates omnidirectional. Optionally it can have a spatial extent, which is specified through a geometric object. If no extent is specified, the source is a point source. The signal component of the Objectsource must contain at least one waveform.

| Attribute | Type | Flags | Default | Description |
| --- | --- | --- | --- | --- |
| orientation | Rotation | O, M | (0° 0° 0°) | Orientation |
| cspace | Coordinate space | O | relative | Spatial frame of reference |
| active | Boolean | O, M | true | If true, then render this source |
| gainDb | Gain | O, M | 0 | Gain (dB) |
| refDistance | Float > 0 | O | 1 | Reference distance (m) (see comment below) |
| inputLayout | Objectsource InputLayout | R* | | Channel layout (see 4.11) * required when signal has multiple waveforms |
| signal | AudioStream ID | R, M | | Audio stream |
| extent | Geometry ID | O, M | none | Spatial extent |
| directivity | Directivity ID | O, M | none | Sound radiation pattern |
| directiveness | Value | O, M | 1 | Directiveness (see 3.4.1) |
| aparams | Authoring parameters | O | none | Authoring parameters (see 4.12) |
| mode | Playback mode | O | continuous | Playback mode {"continuous", "event"} |
| Play | Boolean | O, M | False | Playback enabled? |
| contentzone | ID | O, M | | This object is part of a content zone |

Create a New Entity Called Content Zone:

\<ContentZone\>

Declares a Contentzone which defines the audio rendering when the user initiates the first rendering mode by entering the firstInnerCircle. The firstInnerCircle has a position and radius in space. The first rendering mode is defined via different options. The secondInnerCircle has a position and radius in space. In absence of secondInnerCircle, the firstInnerCircle is used as the secondInnerCircle as boundary condition to initiate the second rendering mode. In the second rendering mode, the constellation of audio objects in the content zone are dragged with the user, consequently the objects become user centric while maintaining the original relative distances.

| Attribute | Type | Flags | Default | Description |
| --- | --- | --- | --- | --- |
| id | ID | R | | Identifier |
| firstInnerCircle | Position, Radius | R, M | | Position and radius of first inner circle |
| firstRenderingMode | ModeType, UpdateCondition | R, M | | First rendering mode consist of different rendering methods |
| SecondinnerCircle | Position, Radius | O, M | | Position and radius of second inner circle. |
| Cspace | Coordinate space | O | relative | Spatial frame of reference |

The different types of firstRenderingMode can be the following:

\<ContentZoneFirstCondition\>

This condition expresses if the listener (user) enters the firstInnerCircle to initiate the first rendering mode.

| Attribute | Type | Flags | Default | Description |
| --- | --- | --- | --- | --- |
| id | ID | R | | Identifier |
| transition | Type | R | | Different types define if the constellation instruments move or indicate any change when the first rendering mode is initiated. |
| relative_distance | Boolean (flag is 0 means fixed relative distance, 1 means modifiable) | R | fixed | This indicates how the relative distance is impacted when the user enters first rendering mode. |

| <ContentZoneSecondCondition> | | | |
|---|---|---|---|
| This condition expresses if the listener (user) touches the boundary of the inner circle (secondInnerCircle if there is one defined or the firstInnerCircle if secondInnerCircle is absent) to initiate the second rendering mode. | | | |
| Attribute | TypeFlags | Default | Description |
| id | ID R | | Identifier |
| convergence_delay | time R | | Indicates the lag in slowly moving the objects when the user drags the inner circle after triggering the second rendering mode. |
| transition | Type R | | Different types define if the constellation instruments move or indicate any change when the first rendering mode is initiated. |
| relative_distance | Boolean (flag is 0 means fixed relative distance, 1 means modifiable) R | fixed | This indicates how the relative distance is impacted when the user enters first rendering mode. |

Figure 14:
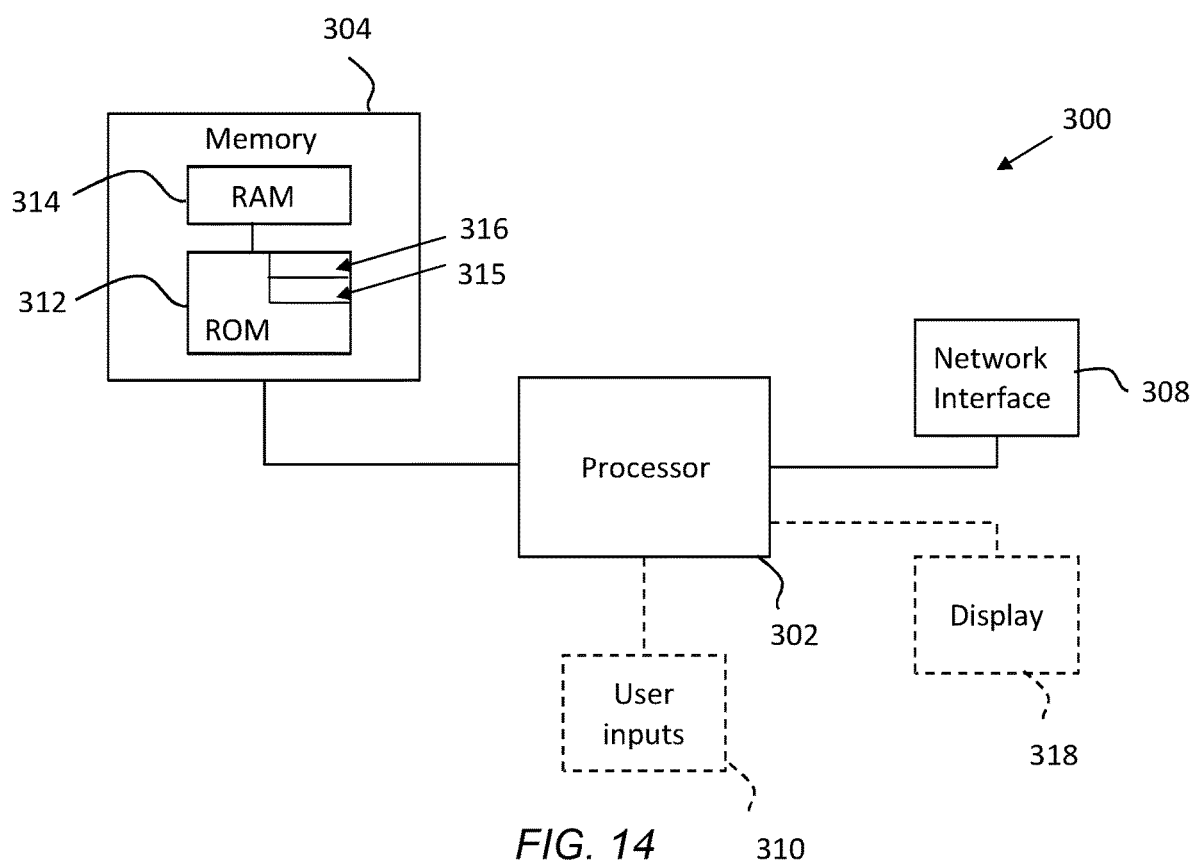
FIG. 14 is a block diagram of components of a system in accordance with an example embodiment.

For completeness, FIG. 14 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 40, 80 and 110 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 15A:
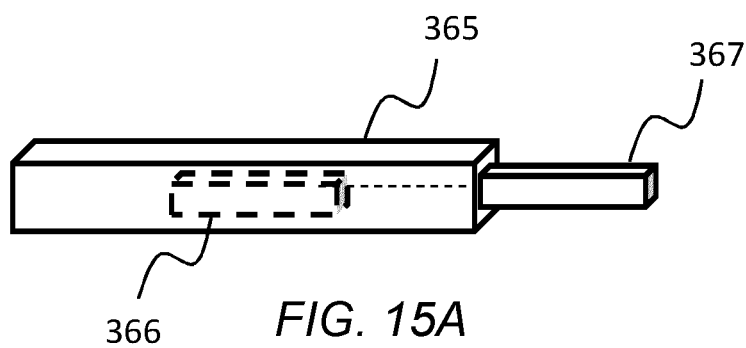
FIGS. 15A and 15B show tangible media, respectively a removable non-volatile memory unit and a Compact Disc (CD) storing computer-readable code which when run by a computer perform operations according to example embodiments.
Figure 15B:
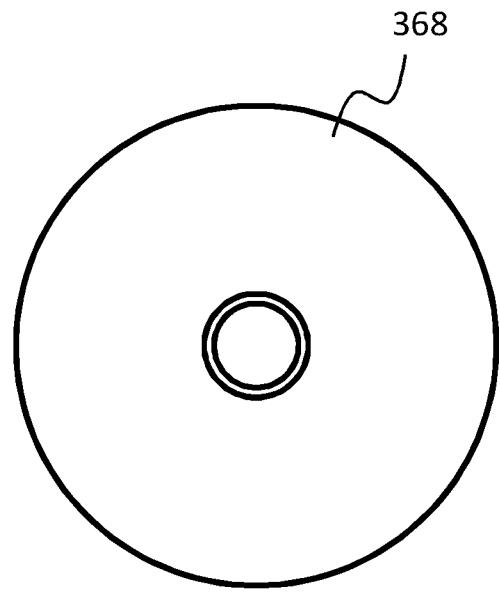

FIGS. 15A and 15B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 3, 4, 8 and 11 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one storing instructions that, when executed with the at least one processor, cause the apparatus to perform:
   determining one of a plurality of audio modes for presentation of first audio to a user based on a location and/or movement of the user within a virtual scene relative to a first zone associated with the first audio, wherein the first audio comprises a plurality of audio tracks located at different locations within the virtual scene, wherein a second audio mode of the plurality of audio modes is determined when the user approaches an edge of the first zone from inside the first zone;
   rendering the first audio to the user in the determined audio mode, wherein:
   in a first audio mode of the plurality of audio modes, the different locations of the plurality of audio tracks within the virtual scene are fixed, and
   in the second audio mode of the plurality of audio modes, the different locations of the plurality of audio tracks within the virtual scene move with the user; and
   moving, in the second audio mode, the first zone and the plurality of audio tracks of the first audio as the user moves.

2. An apparatus as claimed in claim 1, wherein, in the second audio mode, the different locations of the plurality of audio tracks within the virtual scene are fixed relative to the user.

3. An apparatus as claimed in claim 1, wherein the instructions, when executed with the at least one processor, cause the apparatus to perform:
   determining that the first audio mode be used for presentation of the first audio when the user enters the first zone or approaches the first zone from outside said first zone.

4. An apparatus as claimed in claim 1, wherein the instructions, when executed with the at least one processor, cause the apparatus to perform:
   positioning the first zone associated with the first audio within the virtual scene, on initiation of the first audio mode, such that the user is at a central point of said first zone.

5. An apparatus as claimed in claim 1, wherein the instructions, when executed with the at least one processor, cause the apparatus to perform:
   gradually moving, in the second audio mode, the first zone and the plurality of audio tracks of the first audio as the user moves.

6. An apparatus as claimed in claim 1, wherein the instructions, when executed with the at least one processor, cause the apparatus to perform:
   enabling the user to exit the first zone.

7. An apparatus as claimed in claim 1, wherein the instructions, when executed with the at least one processor, cause the apparatus to perform:
   determining that the first audio mode be used for presentation of the first audio to the user where the user is determined to be stationary.

8. An apparatus as claimed in claim 1, wherein the instructions, when executed with the at least one processor, cause the apparatus to perform:
   selecting the first audio from a plurality of candidate first audios based on determining that the user is located, in the virtual scene, within a constellation of audio tracks of the selected first audio.

9. An apparatus as claimed in claim 8, where the instructions, when executed with the at least one processor, cause the apparatus to perform:
   determining that the user has exited the constellation of audio tracks of the first audio or another constellation of audio tracks of the first audio; and
   ceasing to render said first audio to the user in response to the determination of said exit.

10. An apparatus as claimed in claim 1 wherein the first audio mode is a six degree-of-freedom audio mode and/or the second audio mode is a three degrees-of-freedom audio mode.

11. An apparatus as claimed in claim 1, wherein audio from different musical instruments are assigned to different ones of the plurality of audio tracks of the first audio.

12. A method comprising:
   determining one of a plurality of audio modes for presentation of first audio to a user based on a location and/or movement of the user within a virtual scene relative to a first zone associated with the first audio, wherein the first audio comprises a plurality of audio tracks located at different locations within the virtual scene, wherein a second audio mode of the plurality of audio modes is determined when the user approaches an edge of the first zone from inside the first zone;
   rendering the first audio to the user in the determined audio mode, wherein:
   in a first audio mode of the plurality of audio modes, the different locations of the plurality of audio tracks within the virtual scene are fixed, and in the second audio mode of the plurality of audio modes, the different locations of the plurality of audio tracks within the virtual scene move with the user; and moving, in the second audio mode, the first zone and the plurality of audio tracks of the first audio as the user moves.

13. A method as claimed in claim 12, wherein, in the second audio mode, the different locations of the plurality of audio tracks within the virtual scene are fixed relative to the user.

14. A method as claimed in claim 12, further comprising:
determining that the first audio mode be used for presentation of the first audio when the user enters the first zone or approaches the first zone from outside said first zone.

15. A method as claimed in claim 12, further comprising:
positioning the first zone associated with the first audio within the virtual scene, on initiation of the first audio mode, such that the user is at a central point of said first zone.

16. A method as claimed in claim 12, further comprising:
gradually moving, in the second audio mode, the first zone and the plurality of audio tracks of the first audio as the user moves.

17. A method as claimed in claim 12, further comprising:
enabling the user to exit the first zone.

18. A method as claimed in claim 12, further comprising:
determining that the first audio mode be used for presentation of the first audio to the user where the user is determined to be stationary.

19. A method as claimed in claim 12, further comprising:
selecting the first audio from a plurality of candidate first audios based on determining that the user is located, in the virtual scene, within a constellation of audio tracks of the selected first audio.

20. A non-transitory computer-readable medium comprising program instructions stored thereon for performing at least the following:
determining one of a plurality of audio modes for presentation of first audio to a user based on a location and/or movement of the user within a virtual scene relative to a first zone associated with the first audio, wherein the first audio comprises a plurality of audio tracks located at different locations within the virtual scene, wherein a second audio mode of the plurality of audio modes is determined when the user approaches an edge of the first zone from inside the first zone;
rendering the first audio to the user in the determined audio mode, wherein:
in a first audio mode of the plurality of audio modes, the different locations of the plurality of audio tracks within the virtual scene are fixed, and
in the second audio mode of the plurality of audio modes, the different locations of the plurality of audio tracks within the virtual scene move with the user; and
moving, in the second audio mode, the first zone and the plurality of audio tracks of the first audio as the user moves.

* * * * *